United States Patent Office 2,946,693
Patented July 26, 1960

2,946,693
METHOD OF MAKING A FOAMED AND EXPANDED PRODUCT FROM VOLCANIC GLASS

Alfred E. Booth, East Hempfield Township, Lancaster County, Pa., assignor to Armstrong Cork Company, Lancaster, Pa., a corporation of Pennsylvania No Drawing. Filed Feb. 25, 1959, Ser. No. 795,328

11 Claims. (Cl. 106—40)

This invention relates to a method of making porous or cellular products from naturally occurring silicious materials, such as volcanic glass, and more specifically pumice, obsidian, and the like. The invention is concerned particularly with the manufacture of thermal and sound absorbing insulations from a fired and foamed volcanic glass powder.

One of the disadvantages of products made from volcanic glass has been the weight of the products as compared with other insulation products made from cork, wood fibers, foamed synthetic resins, and the like. There is a need for a porous or cellular structural material and for other products made from inorganic materials having a low density, in the order of 15 pounds or less per cubic foot, preferably with uniformly distributed cells or pores of relatively small size. An object of the invention, therefore, is to provide a process for the production of low density porous or cellular products from fired and foamed volcanic glass.

There is also a need for a low density, sound absorbing material with interconnected pores or cells made wholly of inorganic materials. Another object of the invention, therefore, is to provide a process for making a lightweight sound absorbing material from foamed volcanic glass.

The low density product produced from foamed volcanic glass in accordance with the preferred practice of the present invention generally will have a cell or pore structure which is too open, i.e., has too many interconnected or intercommunicating pores or cells, for optimum efficiency as a low temperature thermal insulation. A further object of the invention is to improve the air impermeability of products made from foamed volcanic glass to make them suitable for certain thermal insulation services.

Other objects of the invention will be clear from consideration of the following detailed description of the invention.

This invention is founded in part on a discovery that a mixture of sodium nitrate and sodium hydroxide possesses unique properties as a fluxing and gassing agent in the manufacture of cellular or porous products from fired and foamed volcanic glass and on the further discovery that after an initial firing of the volcanic glass to flux and substantially expand it, using the mixture of sodium nitrate and sodium hydroxide as a fluxing and gassing agent, there is chemically and physically formed directly within the cell walls of the expanded product a prefluxed volcanic glass and a potentially active gassing agent. Thus, if the expanded product is cooled and reground to a fine powder and then is refired at a temperature within the softening temperature range of the prefluxed volcanic glass, the potentially active gassing agent which is combined directly within the material is activated and gas is evolved within the heat softened batch and forms a cellular or porous product.

According to the invention, a naturally occurring silicious material such as volcanic glass as mentioned above, is ground to a powder. With this powder are mixed sodium nitrate and sodium hydroxide, preferably with water adequate to moisten the volcanic glass powder. The batch thus formed is dried and then is fired at a temperature which fluxes and softens the volcanic glass and simultaneously releases gas from the fluxing and gassing agent into the softened volcanic glass for the formation of pores or cells therein. The firing is continued until the gas released into the softened glass batch (a foaming or sponging action) produces a porous or cellular product of the desired density, generally in the order of 10 to 20 pounds per cubic foot with an irregular pore or cell structure. The product is stabilized and then is annealed by controlled cooling.

According to another aspect of the invention, the powdered volcanic glass is mixed with sodium nitrate and sodium hydroxide fluxing and gassing agent. The mass is dried and then is fired to obtain a large but not necessarily controlled expansion. The fluxing and gassing agent is chemically and physically combined with the volcanic glass in the cell walls. The expanded mass is cooled and then ground to a fine powder. The reground powder then is refired—additional fluxing and gassing agent is not required—and a porous or cellular product with an unusually uniform cell structure results. This expanded product then is stabilized, cooled, and annealed.

The following examples illustrate specific embodiments of the invention:

Example I 150 parts of volcanic glass, specifically the naturally occurring porous silica-alumina material mined at Idaho Falls, Idaho, and known as Idolite, are ground to a fine powder in a ball mill or hammer mill. The size of the particles should be as small as economically feasible, with particles in the range of minus 100 mesh or lower being preferred. 26 parts by weight of a mixture of 7.5 parts by weight of sodium nitrate and 18.5 parts by weight of sodium hydroxide are dissolved in about 25 parts by weight of water.

This represents about an 11.4 alkali or $Na_2O$ addition to the volcanic glass, based on the weight of the glass, and the mixture is in a 1:5.3 mol ratio of sodium nitrate to sodium hydroxide.

The solution thus prepared is mixed with the powdered volcanic glass and serves to dampen it. The mass is dried and about 9 pounds of it are spread as a substantially uniform layer over the bottom of a stainless steel pan having a bottom about 13" x 25" and side walls about 4" high. This provides a layer of material about ½" thick which is adequate upon expansion to produce a 4" thick slab of finished expanded material. The mass then is delivered into a zone heated furnace where it is first preheated to about 1200° F. for about 30 minutes and then is transferred to a firing zone where it is fired at a temperature of about 1500° F. for about 30 minutes or until a slab roughly 4" thick has been formed. The fired mass then is passed into a stabilizing zone heated to about 1200° F. where it is held for about 30 minutes to minimize shrinkage and collapse the cell walls. It then is passed into a cooling zone where the temperature of the mass is cooled to about 1000° F. in 30 minutes.

The mass now is removed from the furnace and stripped from the pan and placed in an annealing furnace where the temperature is about 850° F. at the start of the annealing operation but gradually is reduced to about 200° F. to 300° F in about twelve to fourteen hours.

The product thus produced will be grey white and will have a density in the order of 11 pounds per cubic foot. The pores or cells will be irregular in size and shape and essentially intercommunicating, thus making the product suited for use as a sound absorbing material, the irregular pore or cell structure providing the desired esthetic appearance and the intercommunicating pores or cells providing good sound absorption efficiency.

The fluxing and gassing action may be explained as follows: During firing, the sodium hydroxide of the fluxing and gassing agent reacts with and fluxes the glass. The sodium hydroxide probably undergoes a change represented as follows:

$$2NaOH \rightarrow Na_2O + H_2O$$

The $Na_2O$ chemically becomes a part of the glass matrix, forming a complex chemical structure, and at the elevated temperature of firing, the water is evolved as a gas. The sodium hydroxide does not simply decompose or volatilize, for it is well known that sodium hydroxide when heated alone boils at a temperature above 2500° F. and is volatilized as gaseous sodium hydroxide, but this temperature is not reached during firing in the present process.

Also, during firing, the sodium nitrate of the fluxing and gassing agent decomposes, for it is known that sodium nitrate starts to decompose at about 715° F. But complete decomposition does not occur instantaneously. Consequently, decomposition continues as the firing of the mass proceeds. When sodium nitrate decomposes, it probably proceeds generally as follows:

$$2NaNO_3 \rightarrow Na_2O + 2NO_2 + O_2$$

During firing, the reaction between the sodium hydroxide and the glass serves to flux and soften the glass at the firing temperature and thus enables efficient trapping of the gaseous products yielded from the sodium nitrate upon its gradual decomposition.

As firing continues, there is probably some reaction of the $Na_2O$ from the sodium nitrate with the softened glass and this too is chemically bound into the glass matrix. The nitric oxide and oxygen which are liberated upon the gradual decomposition of the sodium nitrate serve to cellulate the softened glass, forming pores or cells therein.

There is evidence also pointing to a reaction between the sodium nitrate and the sodium hydroxide. It is known from the fusion diagram of the system $$NaOH.NaNO_3$$

that definite chemical compounds are formed at 2:1 and 1:1 mol ratios of sodium hydroxide to sodium nitrate. Whether such compounds are formed during firing of the batch is not now known. It is possible that the sodium hydroxide-sodium nitrate reaction product which is formed has a higher decomposition temperature than that of sodium nitrate. This would account for the unusual release of gas into the batch at temperatures far exceeding the decomposition temperature of sodium nitrate. Regardless of theory, however, it has been found that the results achieved with the combination of sodium nitrate and sodium hydroxide are substantially different from those obtained by the use of either sodium nitrate or sodium hydroxide alone.

A more uniform cell or pore formation with better control of formation and distribution of the pores or cells than in Example I may be achieved by regrinding and refiring in the manner disclosed in the following example:

*Example II*

The batch of volcanic glass and sodium nitrate-sodium hydroxide fluxing and gassing agent of Example I is prepared and the mixture is preheated to 1200° F. for about 30 minutes and then is fired at about 1500° F. for 30 minutes or until a substantial expansion has been effected, in the order of 8 to 10 times the original volume. The expanded mass is cooled down rapidly and may shatter and split as the temperature falls below the normal annealing temperature. The mass is removed from the pan, generally as pieces, after the material has cooled sufficiently to permit handling. The pieces then are reduced to a powder in a ball mill or hammer mill. The size of the particles again should be as small as economically feasible, with particles in the range of minus 100 mesh or lower being preferred.

About 9 pounds of this reground powder are distributed as a substantially uniform dry layer in the bottom of a closed stainless steel mold about 13″ x 25″ x 4″. The lid is then clamped onto the mold and the mass is preheated to about 1200° F. for about 30 minutes. It is then refired at about 1500° F. for about 30 minutes. In the refiring, no added blowing or sponging agent is required. This refiring causes the mass to reexpand and fill the mold. After refiring, the mold is passed into a stabilizing zone where the temperature of the furnace is about 1200° F. The mold is held in this zone for about 30 minutes and then is passed into a cooling zone where the temperature of the furnace is about 1000° F. The mold is maintained in this zone until the mass has attained a temperature of about 1000° F., generally requiring about 30 minutes. The mold now is removed from the furnace, and the product is stripped from the mold. The product then is delivered directly to an annealing furnace where the temperature is about 850° F. and is gradually reduced to about 200° F. to 300° F. to anneal the product in about 12 to 14 hours.

An expanded, substantially white, product is produced with fine pores or cells and with the pores or cells of substantially uniform size and distribution. The product has a density in the order of 11 pounds per cubic foot. Air permeability tests on the product indicate that a substantial portion of the cells are interconnected.

With the process of this embodiment, it is possible to use adequate fluxing and gassing agent to obtain unusually high degrees of expansion on first firing, for the formation of small and uniformly sized cells or pores in the originally formed block prior to regrinding is of no importance, the product being reduced to a powder prior to refiring. The volcanic glass is adequately fluxed, with the fluxing and gassing agent being chemically and physically bound within the reground powder, and the softening range of the fluxed volcanic glass is lowered to a degree where, upon reheating of the reground powder, the gas which is liberated from directly within the softened mass effects the formation of small, uniform pores or cells and excellent control of the process may be achieved.

The following example illustrates an embodiment of the invention by which the air impermeability of a foamed volcanic glass may be improved to make it suitable for some low temperature thermal insulation services.

*Example III*

The same procedure as in Example II is followed up to and including the regrinding of the initially fired batch. At this point, there is added about 10% by weight, one part for each 10 parts of the reground batch, of finely ground low softening point glass; for example, a glass having a softening range of about 1300° to 1500° F., which is at or below the refiring temperature of the batch. Preferably, flint container glass cullet is used because it is cheap and readily available. The mass then is preheated, refired, stabilized, and annealed in the same manner as in Example II.

The resulting product may be slightly higher in density than the product of Example II but will have greater crushing strength and its air permeability will be lower. This may be important in thermal insulation materials for some services. Generally, in the order of 5% to 10% by weight, of low softening point glass based on the weight of the reground batch, will be adequate for the purpose of achieving the desired improvement in air impermeability. It is believed that the added low melting point glass serves to seal some of the pores or cells in the finished product. Regardless of theory, the product of Example III has an improved air impermeability characteristic over the same composition without the added glass.

From the foregoing examples, and the discussion above, it will be clear that the mixture of sodium nitrate and sodium hydroxide reduces to a substantial degree the softening range of the glass and provides at the same time for efficient gas evolution at such lowered temperatures. By using this combination fluxing and gassing agent, relatively small amounts may be incorporated into the glass and excellent expansions attained. Where leaching of alkali from the finished product is a factor of importance, as in thermal insulation materials exposed to moisture, it is desirable to keep the alkali addition to the glass as low as possible.

Care must be exercised, of course, to insure that adequate gas evolution is effected within the desired softening temperature range of the glass; for, if the gas is released before the glass has softened adequately, the glass mass will be tough, and inadequate expansion will occur. On the other hand, if the gas is not liberated until the mass has passed beyond the desired softened condition, the cells or pores will not form or will if formed collapse and form into large bubbles or blisters instead of fine, uniform pores.

By use of a combination of sodium nitrate and sodium hydroxide as a fluxing and gassing agent and following a refiring technique in accordance with the present invention, it is possible for the first time properly to control pore or cell formation in the manufacture of porous or cellular products from foamed volcanic glass.

The proportioning of the fluxing and gassing agent to volcanic glass will vary, of course, with the density desired in the final product, the volume of gas evolved from the selected mixture at the firing temperature employed, the proportioning of sodium nitrate to sodium hydroxide, the type of volcanic glass used, the firing temperature and cycle, the use of a single firing or a refiring process, and other variable factors. As a general rule, from about 5% to about 35% of fluxing and gassing agent, based on $Na_2O$ yield, will be adequate, such proportioning being based on the weight of the glass. The preferred proportioning is in the range of about a 5% to about a 15% addition, as in the specific examples.

Determination of $Na_2O$ yields may be made as follows: The $Na_2O$ yield from sodium hydroxide is 1:2 on a mol basis, as noted in the equation given above, where to provide one mol of $Na_2O$, 2 mols of NaOH are required ($2NaOH \rightarrow Na_2O + H_2O$). Sodium oxide ($Na_2O$) has a molecular weight of 62; sodium hydroxide (NaOH) has a molecular weight of 40. Since two mols of sodium hydroxide are required to yield one mol of sodium oxide, on a weight basis 80 parts of sodium hydroxide yield 62 parts of sodium oxide. Thus, to determine the yield of sodium oxide from sodium hydroxide, the weight of the sodium hydroxide is multiplied by the molecular weight ratio of sodium oxide over sodium hydroxide. This is represented as follows:

$$\text{Weight of NaOH} \times \frac{62}{2(40)} = \text{weight of } Na_2O$$

The $NaO_2$ yield from sodium nitrate, molecular weight 85, considering the molecular weight difference as in connection with sodium hydroxide discussed above, will be as follows: The $Na_2O$ yield from sodium nitrate is also 1:2 on a mol basis ($2NaNO_3 \rightarrow Na_2O + 2NO_2 + O_2$). Sodium nitrate ($NaNO_3$) has a molecular weight of 85. To determine the yield of $Na_2O$ from sodium nitrate, the weight of the sodium nitrate is multiplied by the molecular weight ratio of sodium oxide over sodium nitrate. This is represented as follows:

$$\text{Weight of NaNO}_3 \times \frac{62}{2(85)} = \text{weight of } Na_2O$$

The proportioning of the sodium nitrate-sodium hydroxide mixture to volcanic glass ideally should be such that the desired softening of the glass is obtained at the temperature of most effective gas release for pore or cell formation, and the degree of foaming or cellulation which affects the density may be controlled by discontinuing firing after a product of the desired density has been produced on final firing, depending upon whether a single firing or a refiring process is used.

The proportioning of the sodium nitrate to sodium hydroxide may be varied depending upon the nature of the product desired, such as density, pore size, pore distribution, and the like, the volcanic glass used in the batch, the firing temperature, the firing cycle, limitations of the firing kiln or oven, and other variable factors. It appears from work which has been accomplished that the greatest degree of expansion for any alkali addition ($Na_2O$) is obtained where the mol ratio is 1:1 or 2:1 sodium hydroxide to sodium nitrate where, as noted above, specific chemical compounds are formed upon fusing sodium hydroxide and sodium nitrate. On a mol percent basis, this represents 50 mol percent sodium nitrate to 50 mol percent sodium hydroxide and 33⅓ mol percent sodium nitrate to 66⅔ mol percent sodium hydroxide. There should be at least 2 mol percent of sodium nitrate in the mixture and not more than about 98 mol percent.

Sodium nitrate appears to have more effect on gas production than sodium hydroxide, but the sodium hydroxide appears to have more effect on fluxing of the glass. Thus, as the ratio of sodium nitrate to sodium hydroxide is increased in the fluxing and gassing agent, more gas is evolved but at the same time less fluxing is effected and trapping of the liberated gas becomes less efficient. This factor should be taken into consideration in determining proportioning of the sodium nitrate and sodium hydroxide in the fluxing and gassing agent for use in the manufacture of any particular type of porous or cellular product.

The firing temperature employed will vary with the volcanic glass used, the proportioning of sodium nitrate to sodium hydroxide, as noted above, the density, pore size, and other physical characteristics desired in the finished product, and the size and thickness of the mass of batch material to be expanded, the firing cycle, the use of a single firing or a refiring process, and other variable factors. Generally, a firing temperature in the range of about 1300° F. to about 2000° F. is adequate. Preferred practice is to fire in the range of 1400° F. to 1600° F., principally because of the excessive costs involved in equipment to withstand higher temperatures and the power or fuel requirements to fire at higher temperatures. Where a refiring process is used, it is generally desirable to initially fire in the range of 1300° F. to 1700° F. and to refire in the range of 1400° F. to 1600° F. but in this embodiment also, firing temperatures as high as about 2000° F. may be used. As indicated above, the mass to be fired also may be tailored to suit the firing conditions and, therefore, the upper limit essentially is one of commercial practicability.

Products of various densities may be formed in accordance with the practice of the present invention. Products with extremely fine pores or cells and minor expansions but high physical strength characteristics can be produced. Also, products with larger pores or cells, and a substantial degree of expansion and consequent lower density may be formed. As mentioned above, the pore or cell size and distribution also can be controlled. Generally, a density in the order of 30 pounds per cubic foot on the upper side of the range down to 7 pounds per cubic foot will be satisfactory for most products fabricated from the blocks or other shapes made in accordance with the practice of the invention. For most thermal and sound absorbing insulation materials, the density should be in the lower portion of the range, in the order of 7 to 15 pounds per cubic foot. For some structural and other uses, densities as high as 30 pounds per cubic foot or higher will be acceptable.

The terms "cells" and "pores," "cellular" and "porous," "foamed" and "foaming" are used in their general sense and are not intended to indicate specifically a closed or noncommunicating cell structure or an open, intercommunicating cell structure. As a general rule, the end products of the invention will include some closed cells and some interconnected cells or pores as they are sometimes designated.

This application is a continuation-in-part of my copending application Serial No. 477,105, filed December 22, 1954, now abandoned.

I claim:

1. In a method of making a foamed and expanded product from volcanic glass, the steps comprising mixing together to form a batch, finely divided volcanic glass and, as a fluxing and gassing agent, a mixture of sodium nitrate and sodium hydroxide in the proportion of about a 5% to about a 35% addition of said fluxing and gassing agent to said volcanic glass, based on the $Na_2O$ yield of the fluxing and gassing agent, said sodium nitrate being present in said mixture to the extent of between about 2 mol percent and 98 mol percent; firing said batch within a temperature range of about 1300° F. to about 2000° F. to react said mixture of sodium hydroxide and sodium nitrate with said volcanic glass and flux and soften the same and simultaneously to release gas into said fluxed and softened glass for substantial foaming and expanding thereof; continuing the firing until the gas released into said softened glass produces a foamed and substantially expanded product; and thereafter annealing the product.

2. In a method of making a foamed and expanded product from volcanic glass in accordance with claim 1, the improvement which comprises firing said batch within a temperature range of about 1300° F. to about 1600° F.

3. In a method of making a foamed and expanded product from volcanic glass in accordance with claim 1, the improvement which comprises adding said fluxing and gassing agent in the proportion of about a 5% to about a 15% addition of said fluxing and gassing agent to said volcanic glass, based on the $Na_2O$ yield of the fluxing and gassing agent.

4. In a method of making a foamed and expanded product from volcanic glass in accordance with claim 1, the improvement which comprises adding said mixture of sodium nitrate and sodium hydroxide in a mol ratio of about 1:1 sodium nitrate to sodium hydroxide.

5. In a method of making a foamed and expanded product from volcanic glass in accordance with claim 1, the improvement which comprises adding said mixture of sodium nitrate and sodium hydroxide in a mol ratio of about 1:2 sodium nitrate to sodium hydroxide.

6. In a method of making a foamed and expanded product from volcanic glass, the steps comprising mixing together to form a batch, finely divided volcanic glass and, as a fluxing and gassing agent, a mixture of sodium nitrate and sodium hydroxide in the proportion of about a 5% to about a 35% addition of said fluxing and gassing agent to said volcanic glass, based on the $Na_2O$ yield of the fluxing and gassing agent, said sodium nitrate being present in said mixture to the extent of between about 2 mol percent and 98 mol percent; firing said batch within a temperature range of about 1300° F. to about 2000° F. to react said mixture of sodium hydroxide and sodium nitrate with said volcanic glass and flux and soften the same and simultaneously to release gas into said fluxed and softened glass for substantial foaming and expanding thereof; dividing said expanded product into a powder; refiring said powder to resoften said fluxed volcanic glass and to release gas from within said fluxed and resoftened volcanic glass to form a foamed and substantially expanded product; and thereafter annealing the product.

7. In a method of making a foamed and expanded product from volcanic glass in accordance with claim 6, the improvement which comprises refiring said batch within a temperature range of about 1400° F. to about 1600° F.

8. In a method of making a foamed and expanded product from volcanic glass in accordance with claim 7, the improvement with comprises initially firing said batch within a temperature range of about 1300° F. to 1700° F.

9. In a method of making a foamed and expanded product from volcanic glass in accordance with claim 7, the improvement which comprises adding said mixture of sodium nitrate and sodium hydroxide in a mol ratio of about 1:1 sodium nitrate to sodium hydroxide.

10. In a method of making a foamed and expanded product from volcanic glass in accordance with claim 7, the improvement which comprises adding said mixture of sodium nitrate and sodium hydroxide in a mol ratio of about 1:2 sodium nitrate to sodium hydroxide.

11. In a method of making a foamed and expanded product from volcanic glass in accordance with claim 6, the improvement which comprises adding to the reground batch prior to refiring about 5% to about 10%, based on the weight of the reground batch, of powdered glass which softens below the softening range of the reground batch.

References Cited in the file of this patent

UNITED STATES PATENTS

| | | |
|---|---|---|
| 1,108,007 | Ribbe | Aug. 18, 1914 |
| 2,102,630 | Kreidl | Dec. 21, 1937 |
| 2,209,163 | Kaloustian | July 23, 1940 |
| 2,209,170 | Nevin et al. | July 23, 1940 |
| 2,514,324 | Ford | July 4, 1950 |